(No Model.)

G. H. A. SCHAEFER.
GALVANIC APPARATUS.

No. 600,380.

Patented Mar. 8, 1898.

Witnesses:
W. J. Schufla
C. B. Butler

Inventor
George H. A. Schaefer
By W. T. Miller
Attorney.

UNITED STATES PATENT OFFICE.

GEORGE H. A. SCHAEFER, OF BUFFALO, NEW YORK.

GALVANIC APPARATUS.

SPECIFICATION forming part of Letters Patent No. 600,380, dated March 8, 1898.

Application filed January 7, 1898. Serial No. 665,919. (No model.)

*To all whom it may concern:*

Be it known that I, GEORGE H. A. SCHAEFER, a citizen of the United States, residing at Buffalo, in the county of Erie and State of New York, have invented certain new and useful Improvements in Galvanic Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in galvanic apparatus for the generation and graded delivery of electricity for healing purposes.

Its object is to provide an improved arrangement and combination of batteries, connecting-wires, switchboard, and inclosing cabinet, in which economy of space and portability are important features and by means of which a current of electricity of graded intensity can be instantly generated for ready application to the human frame.

To these ends my invention consists of an improved apparatus which will be fully hereinafter described, and pointed out in the claim.

Figure 1:
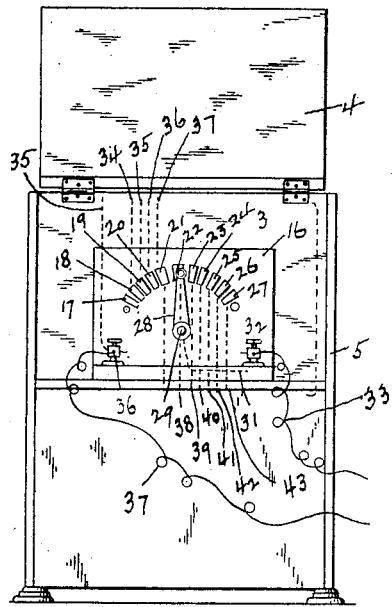
Figure 2:
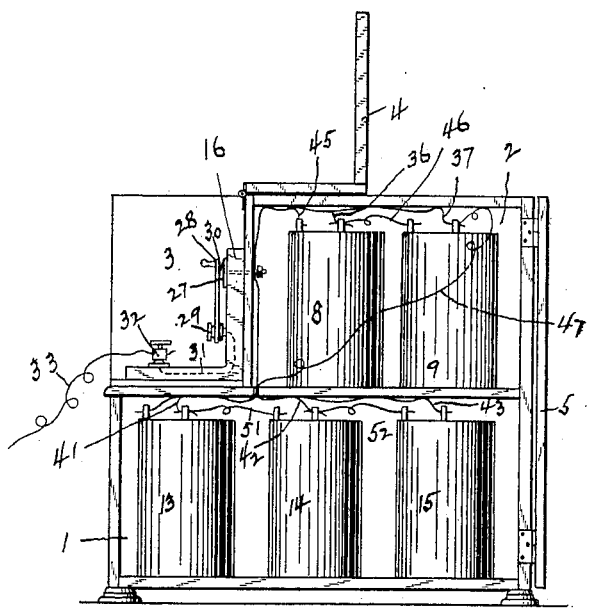
Figure 3:
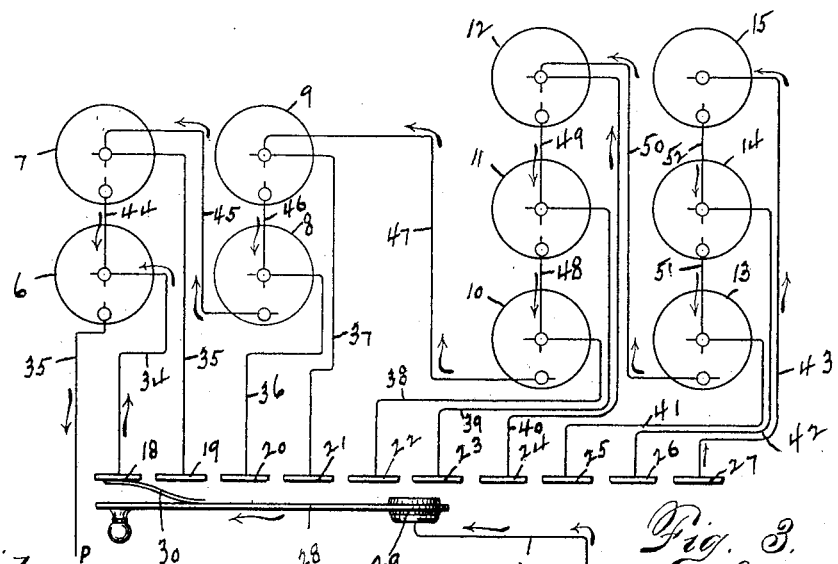

In the drawings, Figure 1 is a front elevation of my improved apparatus with the switchboard-compartment thrown open. Fig. 2 is a side elevation of Fig. 1 with one side of the inclosing cabinet thrown open; and Fig. 3 is diagrammatic view showing the arrangement of the batteries, connecting-wires, and switchboard.

Referring to the drawings, it will be seen that the inclosing cabinet consists of the lower compartment 1, which occupies the entire space of that portion of the cabinet, the upper rear compartment 2, occupying about two-thirds of the space of that portion of the cabinet, and the upper front compartment 3, occupying the remaining one-third of the upper space. Access to this compartment 3 is had by throwing back the angular hinged cover 4. The side wall 5 of the cabinet is hinged, as shown in Fig. 2, and can be thrown back to obtain access to the compartments 1 and 2.

In the upper compartment 2 are placed the nest of batteries 6, 7, 8, and 9, and in the lower compartment 1 are placed the nest of batteries 10, 11, 12, 13, 14, and 15, making, preferably, together ten in number.

Upon the front face of the rear vertical wall of the compartment 3 is secured the switchboard 16. Upon this board 16 are arranged in the line of a circle the eleven metallic plates numbered from 17 to 27, inclusive.

28 is a metallic switch pivoted at 29, carrying on its inner face the spring-strip 30, adapted for separate contact with any of the plates 17 to 27. A wire 31 connects the switch 28 with the binding-post 32, to which is secured the negative wire 33 of my galvanic apparatus.

Referring particularly to the diagram in Fig. 3, the plate 18 is connected by negative wire 34 to battery 6, the positive wire 35 of which leads to the binding-post 36, to which is connected the positive wire 37 of my improved galvanic apparatus. The wires 33 and 37 are to be placed in contact with different portions of the body of the patient, and when the switch 28 30 is in contact with the plate 18 the patient will receive the electricity generated by the battery 6. The plates 19 to 27, inclusive, are successively and separately connected to the batteries 7 to 15, inclusive, by the negative wires 35 to 43, inclusive. The batteries 7 and 6, 8 and 7, 9 and 8, 10 and 9, 11 and 10, 12 and 11, 13 and 12, 14 and 13, and 15 and 14 are successively and separately connected by the positive wires 44 to 52, inclusive.

It will be seen by referring to Fig. 1 that the negative wires 34, 35, 36, and 37 pass upwardly from the plates 18, 19, 20, and 21 to the upper compartment 2 and connect, successively, with the upper batteries 6, 7, 8, and 9. In the same manner the wires 38 to 43, inclusive, pass downwardly from the plates 22 to 27, inclusive, into the lower compartment 1 and connect, successively, with the lower batteries 10, 11, 12, 13, 14, and 15. The connecting positive wire 47 passes down from the upper battery 9 to the lower battery 10.

In operation when the switch is on the plate 17 the circuit is broken and the wires 33 and 37 are dead. When the switch is on the plate 18, the electricity generated by the battery 6 can be utilized, as has been heretofore explained.

If it is desired to increase the intensity of the current by the contents of one more battery, the switch is pushed into contact with the plate 19, which brings the battery 7 into the circuit, thus utilizing two batteries. In the same manner any number of batteries from one to ten may be instantly utilized and the intensity of the current correspondingly increased or lessened within the given limits, as required by the patient under treatment.

It will be seen by the foregoing that my improved galvanic apparatus is very compactly arranged with special reference to the space occupied as well as its portability, and easy access is obtained to the switchboard as well as the various batteries for ready manipulation, adjustment, and repair, while the cabinet can be securely closed when not in use or when transported from one place to another.

I claim—

A galvanic apparatus consisting of a cabinet having a lower compartment, an upper rear compartment and an upper front compartment, an angular cover for opening or closing the upper front compartment and a hinged side wall for opening or closing the lower and upper rear compartments, a number of batteries located in the lower and upper rear compartments, a series of metal plates located in the upper front compartment and successively connected to the batteries by negative wires, a series of positive wires successively connecting each battery with the next, a pivoted switch adapted for separate contact with the metallic plates connected to the batteries for increasing or lessening the electric current as described and a positive and negative wire for contact with the patient under treatment connected to the batteries and to the switch for utilizing the current from any number of batteries as desired.

In testimony whereof I have signed my name to this specification in the presence of two subscribing witnesses.

GEORGE H. A. SCHAEFER.

Witnesses:
JAKOB KELLER,
W. T. MILLER.